May 5, 1953　　　W. D. HERSHBERGER　　　2,637,767
WIDE BAND MICROWAVE SPECTROSCOPY
Filed July 16, 1949　　　　　　　　　　　　2 SHEETS—SHEET 1
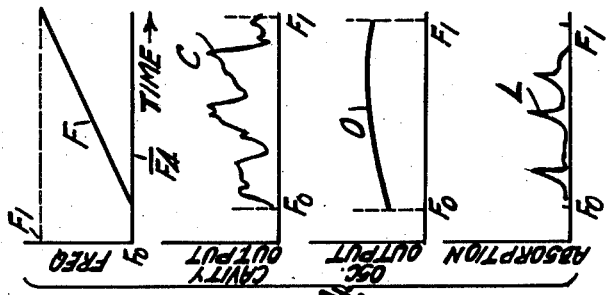
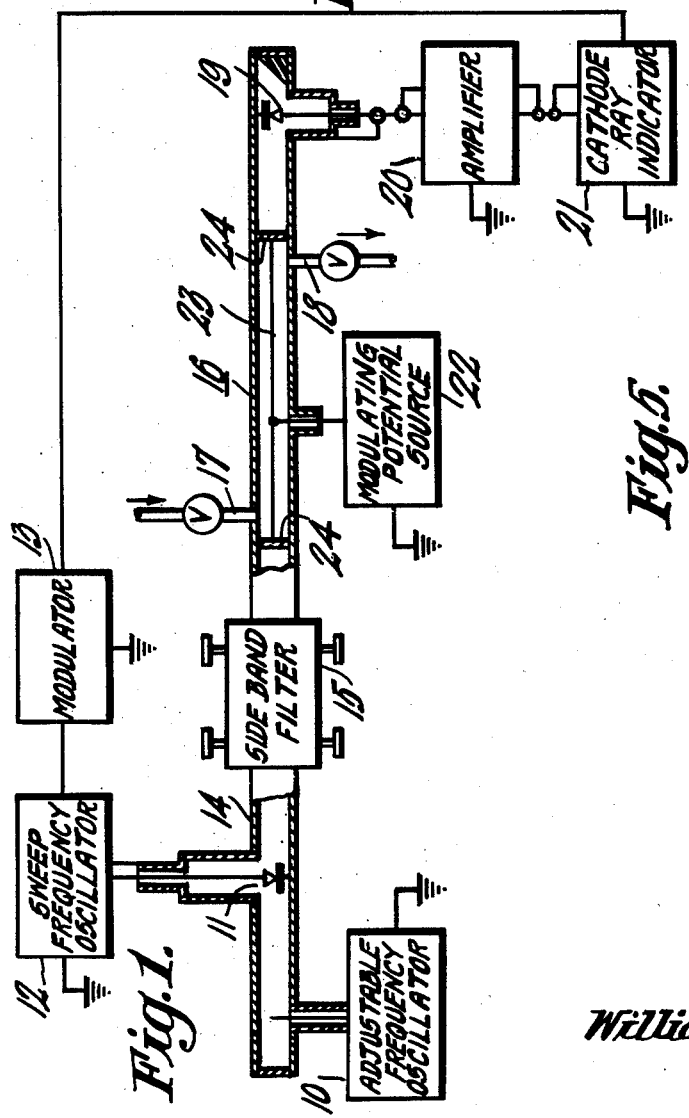
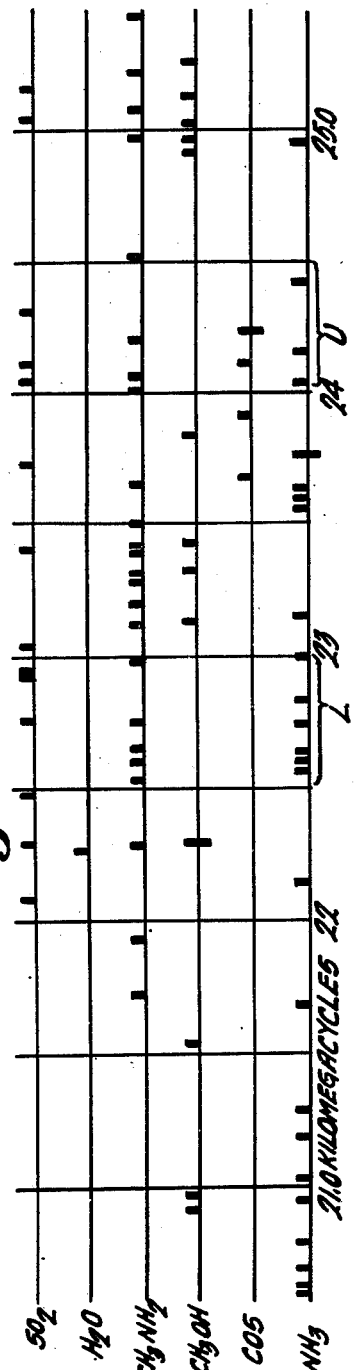
INVENTOR
William D. Hershberger
BY
[signature]
ATTORNEY May 5, 1953  W. D. HERSHBERGER  2,637,767
WIDE BAND MICROWAVE SPECTROSCOPY
Filed July 16, 1949  2 SHEETS—SHEET 2
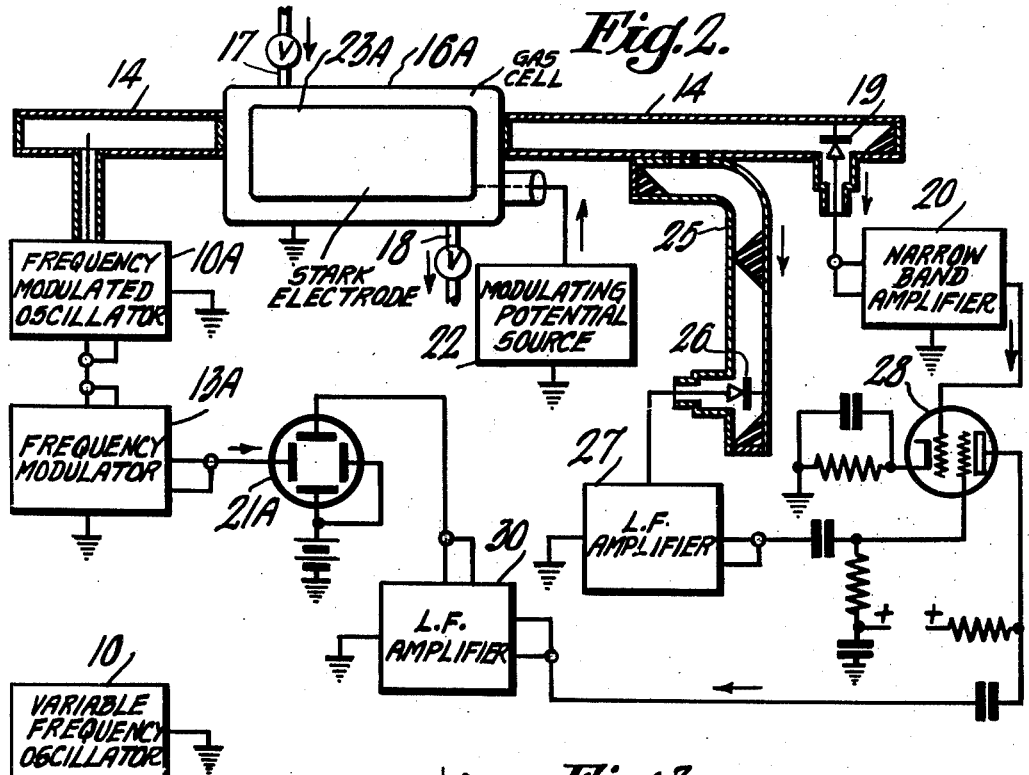
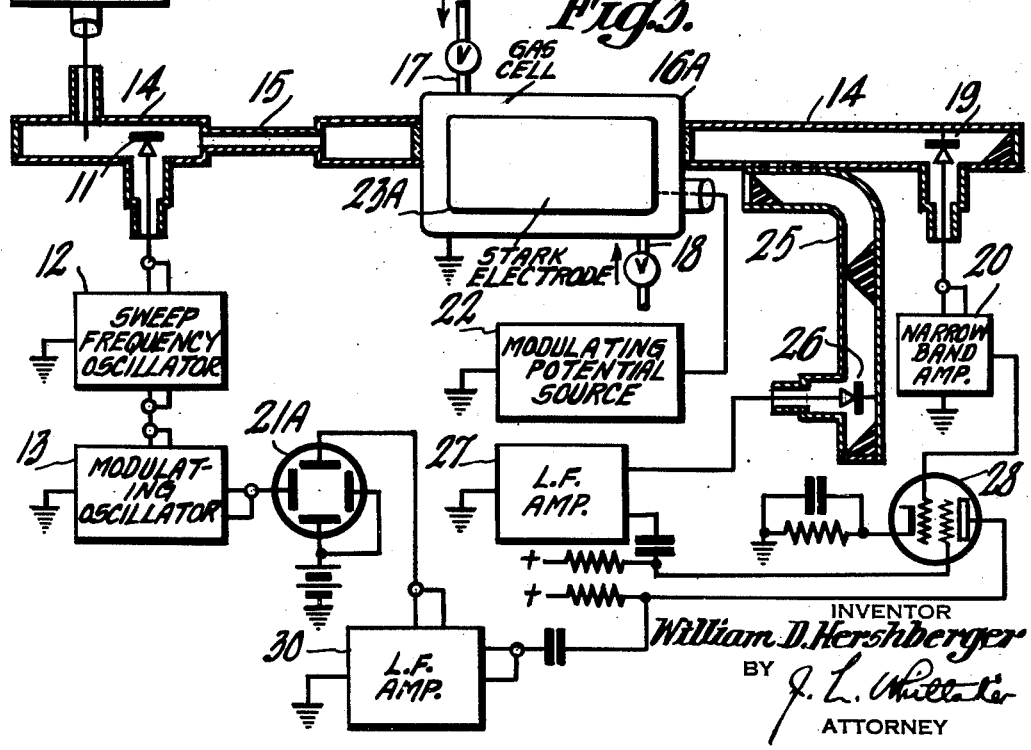
INVENTOR
William D. Hershberger
BY
ATTORNEY

Patented May 5, 1953

2,637,767

UNITED STATES PATENT OFFICE 2,637,767

WIDE BAND MICROWAVE SPECTROSCOPY

William D. Hershberger, Princeton, N. J., assignor to Radio Corporation of America, a corporation of Delaware Application July 16, 1949, Serial No. 105,245

10 Claims. (Cl. 175—183)

This invention relates to microwave spectroscopy, and particularly to methods and systems for sweeping a gas to be analyzed with a wide band of microwave frequencies.

In microwave spectroscopes heretofore used, the scanning range or sweep band is necessarily narrow, usually not more than about 20 megacycles, because of spurious indications which otherwise arise due to variation, with frequency, of the standing wave pattern of the gas cell and of the output of the source of microwave energy impressed on the gas cell. Consequently, investigation with such spectroscopes of a band of frequencies which is wide, for example of the order of hundreds of megacycles, is a slow, uncertain and tedious procedure, not suited for industrial or other processes where the gases being analyzed are of varying composition.

It is an object of the present invention greatly to extend the utility of a microwave spectroscope for industrial analysis or spectrographic studies by providing that over a greatly extended range of frequencies, the spurious responses due to moding of the gas cell shall be eliminated so far as the associated indicating or recording instrument is concerned.

The present invention is an improvement upon spectrographic methods and systems described and claimed in my copending application Serial No. 596,242, filed May 28, 1945.

In accordance with some methods and systems utilizing the present invention, the output of a microwave oscillator operating at fixed frequency is impressed upon a broad-band mixer upon which is also impressed the output of a lower frequency oscillator modulated to effect variation of its frequency over a band of width of the order of hundreds of megacycles. One of the resulting side bands, selected by a suitable microwave filter, is impressed upon the gas for measurement or indication of its selective frequency-absorption over the wide range of variation of the side-band frequency.

Further in accordance with some systems and methods utilizing the invention, particularly those employing large resonant cavities as gas cells for detection of feeble absorption lines, there is utilized a Stark electrode whose potential is modulated at a frequency substantially different from the scanning frequency to permit selection and indication of the absorption-line responses as distinguished from responses due to moding of the cavity. This method of segregating and eliminating spurious responses may be used either with a two-oscillator and mixer arrangement or with a single microwave oscillator frequency-modulated over a wide band; in either case, a demodulator and low-frequency network may be used to derive from the output of the cavity a signal utilized to control the gain of a receiver for the Stark electrode modulation, so to eliminate from its output the undesired components arising because of the output/frequency characteristics of the cavity and of the source of microwave energy for the cavity.

The invention further resides in methods and systems having the novel features of operation and construction hereinafter described and claimed.

For a more detailed understanding of the invention and for illustration of systems utilizing it, reference is made to the accompanying drawings in which:

Figure 1 is a block diagram of a spectroscope using a fixed-frequency microwave oscillator, a mixer and a wide-band, variable-frequency oscillator;

Figure 2 is a block diagram of a microwave spectroscope using a frequency-modulated microwave oscillator;

Figure 3 is a block diagram of a microwave spectroscope utilizing features of Figures 1 and 2;

Figure 4 is an explanatory figure referred to in discussion of Figures 1 to 3; and Figure 5 illustrates the absorption-line spectra of several gases.

Similar reference characters are applied to similar elements throughout the drawings.

Referring to Figure 1 as exemplary of a microwave spectrograph embodying the invention, the microwave oscillator 10, which may be a klystron, magnetron or other microwave generator, is adjusted to operate at a selected fixed frequency $F_1$. For purposes of explanation, and as a specific example, oscillator 10 is assumed to be a conventional 2K33 klystron adjusted to generate oscillations at a fixed frequency $F_1$, of say 23.5 kilomegacycles. The output of oscillator 10 is impressed upon a broad-band mixer 11 of suitable known type, as described for example by Edwards in the Proceedings of the Institute of Radio Engineers' issue of November 1947, pages 1181 to 1191, upon which is also impressed the output of an oscillator 12 which is frequency-modulated repeatedly to sweep over a wide band ($F_2$–$F_3$) of frequencies. Specially, the oscillator 12 may comprise a 6F4 tube having a "butterfly" tank circuit whose rotor is motor-driven at a speed corresponding with a low modulating-frequency $F_4$: with such tube and tank circuit, the frequency of oscillator 12 may be varied over a wide range, for example, from 500 to 1,000 megacycles.

The output of mixer 11 therefore comprises two side bands in the microwave-frequency region, each sweeping, in the specific example given, a range of frequencies which is 500 megacycles wide; specifically, the lower side band L (Figure 5) sweeps from 22.5 to 23 kilomegacycles, and the upper side band U (Figure 5) repeatedly sweeps over a range from 24 to 24.5 kilomegacycles. As is apparent from Figure 5, each of these ranges includes a substantial number of absorption lines of several gases. A selected one of the two side bands is transmitted through a filter 15 interposed in the transmission line of waveguide 14 between the broadband mixer 11 and the cell 16 which contains a sample of the gas to be analyzed. The gas cell 16 may be a section of waveguide or a resonant cavity, the windows 24—24, of mica or equivalent, serving as gas-tight seals which are essentially transparent to the microwave energy. Preferably, for reasons later discussed, the gas cell 16 is a resonant cavity of large dimensions.

For continuous monitoring of an industrial process, for example, the gas cell 16 is provided with inlet and outlet conduits 17, 18 permitting continuous flow of the gas sample through the cell, at sufficiently low pressure to provide suitable separation of the gas lines to be observed.

The side-band energy not absorbed by the gas is rectified by demodulator 19 disposed in waveguide 14 beyond the gas cell 16. The output of rectifier 19, which is preferably of the crystal type, is amplified by a narrow-band amplifier 20 and impressed upon an exhibiting instrument 21 which may be a cathode ray oscilloscope whose sweep rate corresponds with the modulating frequency $F_4$. The sweep frequency $F_4$ impressed upon one deflection circuit of the cathode ray oscilloscope may be produced within the oscilloscope itself, or as indicated in Figure 1, may be derived from the modulator 13 for the variable-frequency oscillator 12.

Thus, in each cycle of the sweep frequency $F_4$, all of the spectral lines of the gas within a broad band (500 megacycle in the example assumed) are presented on the face of the cathode ray tube, and because of persistence of vision or of the screen phosphor of the tube the oscilloscope pattern simultaneously shows all absorption lines within the frequency range swept by the selected side band.

Still considering the frequencies assumed and referring to Figure 5, it is thus apparent that a substantial number of gas lines are swept by each side band (U, L) for a single frequency-setting of the microwave oscillator 10. This is in marked contrast with prior arrangements which swept over a frequency range of only about 20 megacycles which is insufficient to include more than a single absorption line for each frequency-setting of the microwave oscillator. Spectrographic studies with the prior arrangements were therefore tedious, and the need repeatedly to reset the oscillator-frequency in a succession of closely adjacent frequencies introduced an uncertainty as to the exact portion of the spectrum being explored. With the arrangement shown in Figure 1, a broad band of frequencies is swept for a single oscillator-frequency-setting, and the characteristic grouping of simultaneously presented lines of known frequency obviates the uncertainty as to the portion of the spectrum being explored.

Using the same basic system and method of Figure 1 with a tunable reflex klystron tube, such as disclosed in J. R. Pierce U. S. Patent 2,406,850, for oscillator 12, a still much wider band of microwave frequencies can be explored for a single setting of oscillator 10. With the reflex klystron tube, the frequency range ($F_2$ to $F_3$) of oscillator 12 may be extremely wide, for example, from 4300 megacycles to 8500 megacycles and consequently exploration of an extremely wide range of frequencies for gas-absorption lines requires only a few frequency-settings of microwave oscillator 10. By way of numerical example, tabulated below, for only three frequency-settings of a 2K33 klystron as fixed frequency oscillator 10 and with the reflex klystron tube as the sweep-frequency oscillator 12, there may be explored nearly all of microwave spectrum from about 12 to 34 kilomegacycles: specifically,

| $F_1$ | Lower Side Band | Upper Side Band |
| --- | --- | --- |
| 20.6 kilomegacycles | 12.1 to 16.3 kilomegacycles. | 24.9 to 29.1 kilomegacycles. |
| 23.6 kilomegacycles | 15.1 to 19.3 kilomegacycles. | 27.9 to 32.1 kilomegacycles. |
| 25.6 kilomegacycles | 17.1 to 21.3 kilomegacycles. | 29.9 to 34.1 kilomegacycles. |

Filters 15 to suppress the lower side bands may simply be interchangeable short sections of waveguide, each dimensioned to have its cut-off frequency suitably lower than the simultaneously produced upper side band which is to be transmitted. Filters to eliminate the upper side bands or to transmit only selected bands corresponding with the lower side bands may be interchangeable microwave-frequency filters electrically corresponding with their low-frequency counterparts but using distributed inductances and capacities instead of lumped parameters.

Only three high-pass filters, three low-pass (or band-pass) filters, a single 2K33 klystron and a single reflux klystron tube of oscillator 12 would be required for exploration of the six wide frequency bands above specified and these six bands, as above stated, would be covered for only three settings of the microwave oscillator 10. Using the same 2K33 klystron and replacing the reflex klystron tube of oscillator 12 by one of the disc-seal or "Lighthouse" type, the intervening range of 21.3 to 24.9 kilocycles can be explored in bands of 0.5 to 1.0 kilocycles; alternatively, by retaining the reflex klystron tube of oscillator 12 and using a klystron tunable to about 17 kilomegacycles or to about 29.5 kilomegacylcies, that intervening range can be covered for a single frequency setting of oscillator frequency $F_1$.

Thus, with a minimum of components and with need for only a few settings of microwave oscillator 10, the extremely wide frequency range of about from 12 kilomegacycles to about 34 kilomegacycles can be explored for gas-absorption lines.

The sweep rate of the reflex klystron tube of oscillator 12 should be relatively low, which is of advantage in the system of Figure 1 in that the amplifier 20 may be a very narrow band amplifier, affording a high ratio of signal-to-noise and so making possible the detection of very weak gas-absortpion lines. For low sweep rates $F_4$, of say 1 second to $\frac{1}{10}$ second per cycle, the exhibiting instrument 21 may be a long persistence cathode ray tube; for low sweep rates of say 1 minute per cycle, the amplifier 20 may have a band-width of 1 cycle and the exhibiting instrument 21 may be a chart recorder. The enhanced sensitivity essential to detection of very weak lines is obtainable only at sacrifice of speed of indication or recording, but the sweep rates above are amply high for many industrial processes and spectrographic studies.

For detection of weak lines or measurement of their correspondingly small absorption coefficients, it is quite necessary to subject large samples of gas at appropriate low pressure to the microwave energy. There is a practical upper limit to the sample volume if a waveguide is employed as the gas cell 16, especially if it is desired to use the Stark effect in attainment of objectives herein later discussed. When the waveguide 16 has a Stark electrode 23 therein, the length of waveguide should not be more than about 15 feet or so, although if the Stark effect is not used, the waveguide cell may be 30 feet long or may be as long as 100 feet. It is preferred for weak line indications to use, instead of a waveguide section, a large volume (high Q) resonant cavity operating at high mode density.

However, such cavity would itself show literally thousands of responses when the driving frequency is swept through a range of say 4,000 megacycles, as above discussed and these responses would mask or be confused with gas absorption responses. To prevent confusion between the responses due to moding of the cavity and the responses due to gas-absorption, the gas-cell cavity is provided with a Stark electrode 23 electrically insulated from the cavity wall structure and connected to a source 22 of modulating potential. By way of example, the Stark electrode 23A, Figure 2, may be an electrode 5 feet long and 5 inches in diameter concentrically disposed in a gas cell cavity 16A which is 6 feet long and 6 inches in diameter.

The effect of applying a modulating potential between the cavity and the Stark electrode is to diminish the peak values of the gas-absorption lines at the frequencies at which they normally occur and also to shift the absorption lines, thus modulating the microwave energy. The modulating-frequency $F_5$ applied to the Stark electrode is high, for example 100 kilocycles, compared to the frequency $F_4$ of the microwave energy which, as above stated, may be of the order of cycles per second, or less. By electrical filtering, the response effects which arise because of sweeping through the cavity modes at low rates may be readily separated from the response effects which arise because of change in amplitude of the gas-absorption lines at high rate. Assuming the Stark modulating-frequency $F_5$ is 100 kilocycles, the receiver or amplifier 20 is tuned to that same frequency (100 kc.), so to eliminate undesired information related to cavity moding, but to retain the desired response information due to the gas-absorption lines.

In the system shown in Figure 2, the microwave oscillator 10A is frequency-modulated as by modulator 13A, of suitable electrical or mechanical type, to sweep over a band of frequencies $F_0$ to $F_1$, which though not nearly as wide as obtainable with the two-oscillator mixer arrangement of Figure 1, is nevertheless wide enough, for example, 50 megacycles, to result in moding of a large resonant cavity used for detection of weak absorption lines. The curve C of Figure 4 is typical of the response of a large volume cavity as the oscillator frequency (curve F of Figure 4) is swept over the range $F_0$ to $F_1$. Thus, there exists the same problem discussed in connection with Figure 1 of eliminating spurious responses, due to cavity-moding, which mask the absorption lines L, Figure 4, of gas within the cavity. In addition, a frequency-modulated oscillator 10A gives rise to other problems because its output varies with frequency, generally as represented by curve O of Figure 4.

As in the system of Figure 1, the effect of cavity-moding is substantially eliminated from the indication or record produced by instrument 21 by applying a modulating potential to a Stark electrode in the cavity and by tuning the receiver 20 to the modulating-frequency $F_5$. However, the trace or record made depends upon the nature of the Stark effect of the individual lines; and the fact that the cavity has a response-characteristic such as shown by curve C, gives a somewhat distorted picture of the gas spectrum under study, both as regards the relative magnitudes of the lines and also, because of the steep slopes of curve C, as regards the exact position of the lines in the frequency spectrum. Additionally, the true relative magnitudes of the lines are not shown because of non-uniformity of the output/frequency characteristic O of the frequency-modulated oscillator 10A.

This distortion of the indication or record is eliminated by varying the gain of the amplifier or receiver 20 in accordance with those components of the output of the cavity which depend upon the output/frequency characteristics (C, O) of the cavity 16A and the microwave oscillator 10A. Specifically, a portion of the output of the cavity is transmitted as by the directional coupler 25 to a demodulator 26, preferably of the crystal type, in the input circuit of a low-frequency or audio amplifier 27. The output of amplifier 27 therefore comprises the low-frequency $F_4$ upon which is superimposed modulation corresponding with the curves C and O of Figure 4, the output/frequency characteristics of the cavity and of the oscillator respectively.

The output of amplifier 27 is utilized so to vary the gain in one or more stages of receiver 20 generically represented by tube 28 that the components of the output of receiver 20 due to the output/frequency characteristics of cavity 16A and oscillator 10A are effectively cancelled. The proper phasing for such elimination can be obtained by proper relative poling of demodulators 19 and 26 and proper selection of the stage or stages to which the gain control is applied. The time constant of the gain-control circuit should be sufficiently low to insure that the gain-control signal, which in Figure 2 is applied to the screen grid of tube 28, will follow the waveform of the output of amplifier 27.

The output of the gain-controlled receiver 20 containing only the components corresponding with gas-absorption lines may be amplified by low-frequency amplifier 30 and impressed upon an exhibiting instrument which may be, as shown in Figure 2, a cathode ray tube 21A.

Where as shown in Figure 3, the two-oscillator-mixer arrangement of Figure 1 is used with a large resonant cavity 16A, the gain of the receiver 20 may be automatically varied as discussed in connection with Figure 2 to eliminate from its output those many components corresponding with moding frequencies of the cavity and also any component due to non-uniformity of the output/frequency characteristics of oscillator 12 and mixer 11. As the system of Figure 3 is a combination of Figures 1 and 2, previously herein fully described, further description thereof appears unnecessary.

What is claimed is:

1. In microwave spectroscopy, a method which comprises enclosing gas to be analyzed in a large, high Q resonant cavity having a Stark electrode therein and subject to a plurality of cavity-moding resonances, subjecting the gas to microwave energy repeatedly swept over a frequency range including a plurality of gas-absorption frequencies and a plurality of cavity-moding resonant frequencies, applying to said electrode a potential modulated at a frequency substantially different from the sweep frequency of said microwave energy, demodulating the microwave energy output of said cavity, and electrically filtering the modulation-frequency component of the demodulated energy from the sweep-frequency component thereof thereby separating the gas absorption responses from the cavity-moding resonance responses.

2. In microwave spectroscopy, a method which comprises enclosing gas to be analyzed in a large high-Q cavity having a Stark electrode therein, subjecting the gas to microwave oscillations whose frequency is repeatedly varied over a range including gas-absorption frequencies and cavity-moding frequencies and for which the amplitude of said oscillations vary, applying to said electrode a potential modulated at a frequency different from the sweep-frequency of said oscillations, demodulating part of the microwave energy of said cavity, electrically segregating the modulation-frequency component of the energy so demodulated, demodulating another part of the microwave energy of said cavity, electrically segregating the sweep-frequency component of the energy so demodulated, and amplifying said modulation-frequency component in accordance with the varying amplitude of said sweep-frequency component.

3. In microwave spectroscopy, a method of exploring a wide band of frequencies including gas-absorption frequencies comprising generating microwave oscillations of fixed frequency outside of said band of frequencies, generating lower frequency oscillations of frequency repeatedly sweeping a range corresponding in width with said wide band of frequencies, mixing said microwave and lower frequency oscillations to produce microwave side-band oscillations repeatedly sweeping said wide band of frequencies, enclosing gas to be analyzed in a gas cell containing a Stark electrode, impressing said side-band oscillations upon said gas, modulating the potential of said electrode at a frequency different from the sweep-frequency of said microwave oscillations, demodulating the microwave energy output of said gas cell, and electrically filtering the modulation-frequency component of the demodulated energy from the sweep-frequency component thereof.

4. A wide-band microwave spectroscope comprising a microwave oscillator, a modulator for repeatedly varying the frequency of said oscillator over a wide range at a low sweep frequency, a cell for containing gas to be analyzed and itself exhibiting resonance at frequencies within said wide range, means for impressing upon said cell the microwave energy whose frequency is swept over said wide range, a Stark electrode in said cell, means for varying the potential of said Stark electrode at a modulating frequency substantially higher than said sweep frequency, means including a demodulator and a frequency-selective network for deriving from microwave energy transmitted through said cell a sweep-frequency signal having components dependent upon the frequency/output characteristics of the oscillator and of said cell over said wide range of frequency, means including a second demodulator and frequency-selective network for deriving from microwave energy transmitted through said cell a modulating frequency signal having components dependent upon aforesaid frequency/output characteristics and upon the absorption of microwave energy by said gas, an amplifier for said modulating-frequency signal, means for controlling the gain of said amplifier in accordance with the variations in amplitude of said sweep-frequency signal, and exhibiting means responsive to the output of said amplifier.

5. A wide-band microwave spectroscope comprising a large, high-Q cavity resonator cell for containing a large volume of gas to be analyzed, means for impressing upon the gas in said cell microwave energy whose frequency is repeatedly swept over a wide range for which said gas exhibits a plurality of sharp molecular resonances and for which said cell exhibits a plurality of excitation modes, means for demodulating the microwave energy transmitted by said gas, exhibiting means responsive to the demodulated microwave energy, and means for eliminating spurious responses due to the plurality of responses to the excitation modes of said gas cell comprising a Stark electrode in said cell, means for varying the potential of said Stark electrode at a modulating frequency substantially different from the sweep frequency of said microwave energy, and a frequency-selective network between said demodulating means and said exhibiting means for selection transmission of the Stark modulating-frequency component of the demodulated microwave energy.

6. A wide-band microwave spectroscope comprising a microwave oscillator for operation at a fixed frequency, a sweep-frequency oscillator for scanning a frequency band of width of the order of hundreds of megacycles at low repetition rate of the order of cycles per second, a mixer upon which the outputs of said oscillators are impressed to produce side bands each sweeping at said low repetition rate over a band of microwave frequencies having said width, a cell upon which one of said side bands is impressed for selection-absorption by gas in said cell at characteristic microwave frequencies and for which there is variation of the excitation mode of said cell or of standing wave distribution therein, means for demodulating the side-band energy selectively transmitted by the gas, and exhibiting means responsive to the demodulated side-band energy substantially to the exclusion of moding or standing wave responses.

7. A wide-band microwave spectroscope comprising a microwave oscillator for operation at a fixed frequency, a sweep-frequency oscillator for scanning a wide band of frequencies, a mixer upon which the outputs of said oscillators are impressed to produce side bands each sweeping a correspondingly wide band of microwave frequencies, a cell for containing gas to be analyzed for selective absorption at frequencies within one of said wide bands of microwave frequencies, an electrical filter between said mixer and said cell for selective transmission to said cell of said one of the side bands, means for demodulating the side-band energy passed by the gas in said cell, and exhibiting means responsive to the demodulated side-band energy.

8. A microwave spectroscope comprising a resonant cavity for containing gas to be analyzed, means for impressing upon said gas microwave oscillations whose frequency is repeatedly swept over a range including a plurality of gas-absorption frequencies and a plurality of moding frequencies of said cavity, a Stark electrode in said cavity, means for applying to said electrode a potential modulated at a frequency substantially different from the sweep frequency of said microwave oscillations, and a receiver responsive to the unabsorbed energy output of said resonant cavity including frequency-selective means for eliminating responses due to moding of the cavity.

9. A microwave spectroscope comprising a resonant cavity for containing gas to be analyzed, means for impressing upon said gas microwave oscillations whose frequency is repeatedly swept over a range including gas-absorption frequencies and moding frequencies of said cavity, a Stark electrode in said cavity, means for applying to said electrode a potential modulated at a frequency substantially different from the sweep frequency of said microwave oscillations, a first receiver responsive to the sweep-frequency component of the output of said cavity, a second receiver responsive to the modulation-frequency component of the output of said cavity, and means for controlling the gain of said second receiver in accordance with the output of said first receiver to insure the output of said second receiver contains gas-absorption information to the exclusion of cavity-moding information.

10. A microwave spectroscope comprising a resonant cavity for containing gas to be analyzed, a variable-frequency oscillator frequency-modulated repeatedly to sweep over a range of frequencies including gas-absorption frequencies and moding frequencies of the cavity and for which the oscillator output is non-uniform, a Stark electrode in said cavity, means for applying to said electrode a potential modulated at a frequency substantially different from the sweep frequency of said oscillator, a first receiver responsive to the sweep-frequency component of the output of said cavity, a second receiver responsive to the modulation-frequency component of the output of said cavity, and means for controlling the gain of said second receiver in accordance with the output of said first receiver to avoid masking of the gas-absorption information by effect upon the cavity output of cavity moding and non-uniformity of the output-frequency characteristic of the microwave oscillator.

WILLIAM D. HERSHBERGER.

References Cited in the file of this patent

UNITED STATES PATENTS

| Number | Name | Date |
|---|---|---|
| 2,457,673 | Hershberger | Dec. 28, 1948 |

OTHER REFERENCES

Physical Review, vol. 71, 1947, pages 562–563, article by Hughes et al.

The Review of Scientific Instruments, vol. 20, No. 11, November 1949, pages 821–826, article by McAfee et al.